United States Patent [19]

Zeller et al.

[11] Patent Number: 4,884,348

[45] Date of Patent: Dec. 5, 1989

[54] TESTING DEVICE AND METHOD OF DETERMINING THE UNCERTAINTY OF MEASUREMENT OF COORDINATE-MEASURING INSTRUMENTS

[75] Inventors: Rudolf Zeller, Donzdorf; Friedrich Kitzsteiner, Bopfingen, both of Fed. Rep. of Germany

[73] Assignee: Carl-Zeiss-Stiftung, Heidenheim/Brenz, Oberkochen, Fed. Rep. of Germany

[21] Appl. No.: 256,630

[22] Filed: Oct. 12, 1988

[30] Foreign Application Priority Data

Oct. 16, 1987 [DE] Fed. Rep. of Germany ....... 3735075

[51] Int. Cl.⁴ .............................................. G01B 5/25
[52] U.S. Cl. ......................................... 33/502; 33/644
[58] Field of Search ................ 33/536, 538, 567, 502, 33/503, 644, 645

[56] References Cited

U.S. PATENT DOCUMENTS

| 4,435,905 | 3/1984 | Bryan | 33/DIG. 1 X |
| 4,437,151 | 3/1984 | Hurt et al. | 33/503 X |
| 4,492,036 | 1/1985 | Beckwith | 33/503 X |

FOREIGN PATENT DOCUMENTS

3504464CL 4/1986 Fed. Rep. of Germany .
3605947AL 8/1987 Fed. Rep. of Germany .

OTHER PUBLICATIONS

Precision Engineering, vol. 4, No. 2, Apr. 1982, pp. 61–69.
Technisches Messen, 51 Jahrgang Heft 3, 1984, pp. 83–95.

*Primary Examiner*—Harry N. Haroian
*Attorney, Agent, or Firm*—Hopgood, Calimafde, Kalil, Blaustein & Judlowe

[57] ABSTRACT

A testing device for use in determining the uncertainty of measurement of a coordinate-measuring instrument comprises a support which can be placed on the measurement table of the coordinate-measuring instrument; the support contains a plurality of locating fastening elements which receive a test standard in different orientations within the measurement range of the coordinate-measuring instrument. The test standard is a ball rod which has a ball fixed to the opposite ends of an elongate body. One end of the ball rod is mounted to the support in a pivot/swivel bearing that is so structured as to permit free measuring-probe access to contact the ball at the thus-mounted end of the ball rod.

19 Claims, 4 Drawing Sheets

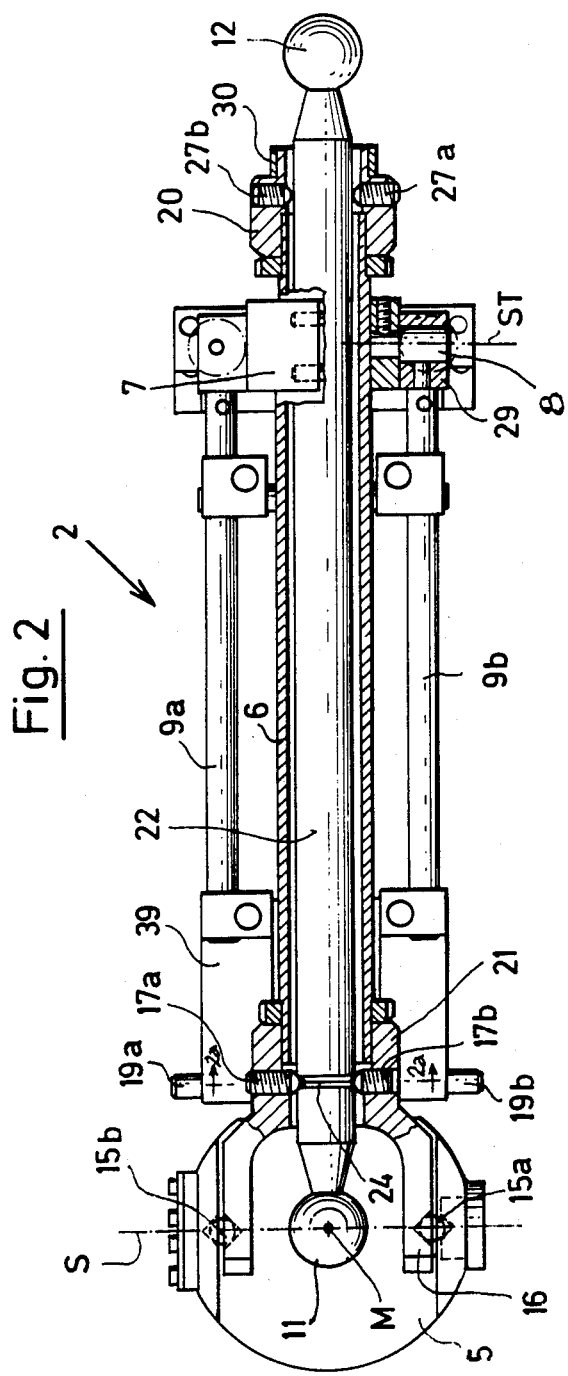
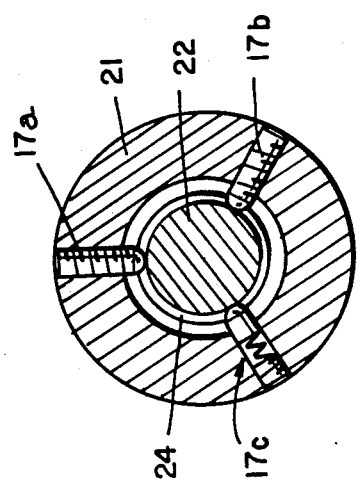
Fig. 2
Fig. 2a.

TESTING DEVICE AND METHOD OF DETERMINING THE UNCERTAINTY OF MEASUREMENT OF COORDINATE-MEASURING INSTRUMENTS

BACKGROUND OF THE INVENTION

The uncertainty of measurement of coordinate-measuring instruments is at present determined predominantly by means of so-called step-end gauges, which are set up in different positions within the measurement range of the coordinate-measuring instrument. With reference to this, there is VDI/VDE Guideline 2617, in which the required structures and method steps are indicated.

It has also been proposed that so-called ball-rod measurements be carried out in order to determine the uncertainty of measurement of coordinate-measuring instruments. According to this method, which is described in "Precision Engineering", Volume 4, No. 2, April 1982, Pages 61–69 and recommended in Standard B 89 of the Bureau of Standards of the USA, a ball rod consists of two steel balls which are connected to each other by a bar of adjustable length. The ball rod is held fast at one end in a magnetic mount on the table of the coordinate-measuring instrument, while the other end of the ball rod is oriented for measurement in different positions; in an alternative method, said other end is moved dynamically via a similar coupling to the probe head of the coordinate-measuring instrument, throughout the measurement range of the instrument. These magnetically mounted techniques are for various reasons unsuitable for determining the uncertainty of measurement of high-precision measuring machines; for example, the steel balls become magnetized and dirty in the course of time. Accordingly, the seat of the ball in the magnetic mount cannot be reproduced with sufficient reliability. The ball that is magnetically mounted cannot be contacted by the measuring instrument, and therefore the length of the ball rod, which after all represents the actual reference in determining the uncertainty of measurement, is not measured directly. Furthermore, the setting of the ball rod in different positions on the measurement table of the coordinate-measuring instrument requires a relatively long time.

The dynamic method cannot in any case be applied universally to all coordinate-measuring instruments since a special probe head is required.

Federal Republic of Germany OS No. 36 05 947 discloses a testing device consisting of a support and of a test standard which can be mounted in different orientations on the support. The support has a pivot bearing via which it, and thus the test standard, can be turned rapidly into different angular positions within the measurement range of the coordinate-measuring instrument. Here, however, use is made of a test body which is not in accord with Standard B 89 of the Bureau of Standards. Furthermore, the change of the test body to different orientations on the support is very cumbersome.

BRIEF STATEMENT OF THE INVENTION

The object of the present invention is to provide a test device for the carrying out of ball-rod measurements on coordinate-measuring instruments which complies with Standard B 89 of the Bureau of Standards and assures the fastest possible course of the procedure.

The invention achieves this object by providing a test standard wherein a ball rod comprises an elongate body with a precision ball fixed to each end, and wherein one end of the ball rod is so mounted in a pivot/swivel bearing for universal movement on the support 1 as to provide free access for measuring-machine probe contact with the ball at the universally mounted end.

Since the ball rod of the invention is thus mounted in a pivot/swivel bearing on the support of the test device, it can be brought very rapidly into the positions required by Standard B 89, and different locating and clamping devices on the support afford simple reference structure whereby the ball rod can be selectively locked in each of the orientations required by the said Standard. Since the ball at the universally mounted end of the rod is accessible for probe contact, the test reference, i.e., the distance between centers of the two balls of the ball rod, can be determined directly by measuring-machine probe contact with both balls.

Having dispensed with need for a magnetic mounting, the two balls of the ball rod may consist, for example, of nonmetallic material, thus totally avoiding the problem of metal-particle accumulation. In addition to providing probe access to the ball at the mounted end, the pivot/swivel joint is preferably a universal joint the two axes of which pass essentially through the center of the ball at the mounted end of the ball rod. In this way, assurance is had that this end of the ball rod is always in substantially the same position.

It is also advantageous for the elongate body connecting the two balls to be surrounded by a support tube. This support tube may serve on the one hand, to isolate the ball from heat which might otherwise produce a longitudinal expansion; such expansion corrupts the measurement and is an essential reason for the long measurement times required in the prior art. Further, the support tube can also serve to hold the ball rod free of stress, for instance by support at the Bessel points, thus minimizing deformation of the ball rod during a testing procedure.

When making ball-rod measurements, the entire testing device, consisting of the mount, the ball rod, the pivot/swivel joint and the attachment elements on the support, is advisedly placed on the rotary table of the coordinate-measuring instrument, so that an automatic CNC-controlled course of the measurement can proceed in a succession of individual steps. If the coordinate-measuring instrument does not have a built-in rotary table, the testing device can be placed on a portable turntable. In such case, it is also possible to provide the testing device itself with a pivot bearing, and possibly an angle encoder and drive of its own. A completely automatic course of the measurement is also possible if the successive reorienting of the ball rod into the required measurement positions is effected by a suitable motor drive or by a robotic device.

DETAILED DESCRIPTION

The invention will be illustratively described in detail in conjunction with the accompanying drawings, in which:

FIG. 2 is a side view in elevation of a ball-rod component of FIG. 1, in the context of structure connected to said component, the view being partly broken-away and in longitudinal section;

FIG. 2a is a sectional view taken at 2a—2a of FIG. 2;

Figure 1:
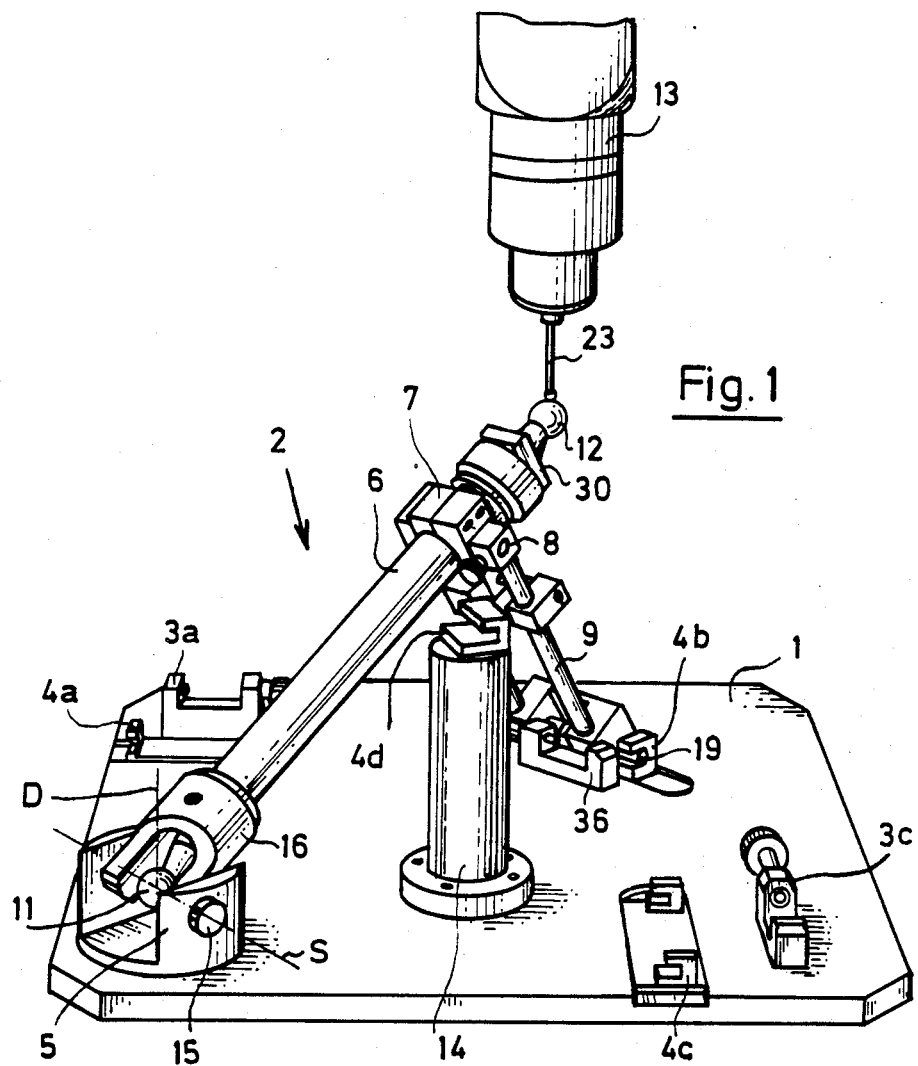
FIG. 1 is a perspective view of a testing device of the invention.

The testing device of FIG. 1 has a support plate 1 which can be placed on the measurement table of a coordinate-measuring instrument; for simplicity, the probe head 13 and its probe pin 23 are the only parts shown for the coordinate-measurement instrument.

In addition to a pivot/swivel joint (involving pivotally connected fork-shaped parts 5/16), the support plate mounts a plurality of rod-end locating elements 3a, 3b, 3c, as well as a plurality of prop-end locating elements 4a, 4b, 4c, 4d. The arrangement of these elements is such that a ball rod 2 inserted into the fork-shaped part 16 of the pivot/swivel joint can be oriented to position its outer-end ball 12 in the different positions which are prescribed in Standard B 89 of the Bureau of Standards.

The part 5 of the pivot/swivel joint, and the rod-end and prop-end locating elements 4 and 3, will all be understood to be removably secured on the support plate 1. As will be described below, this makes it possible to convert the testing device to serve different specific purposes.

The structure of the ball rod 2 is shown in greater detail in FIG. 2; it consists of a cylindrical rod 22 of Invar, each of the ends of which fixedly mounts a ball (11 and 12, respectively) of aluminum-oxide ceramic. Near the end which mounts ball 11, rod 22 is provided with an annular groove 24, where rod 22 is axially retained by three angularly spaced, spherically rounded contacts, two of which are ends of screws 17a, 17b and the third of which 17c is under spring action; these retaining elements 17a, 17b, 17c are in an annular collar 21 of the fork-shaped part 16 of the pivot/swivel joint. The pivot axis S of the pivot/swivel joint is horizontal and is established by two spaced bearing balls 15a and 15b which seat in opposed conical depressions of adjacent tines of the fork-shaped parts 5 and 16. The swivel axis D is vertical and can be noted only in FIG. 1; it will be understood to be formed by a rotary bearing for part 5 in plate 1.

A cover tube 6 surrounds the Invar rod 22 and is mounted at one end to a counterbore in collar 21 of the fork-shaped part 16. And radial clearance exists between the Invar rod 22 and the cover tube 6, so that these two parts are thermally disconnected. The ball rod can therefore be grasped via the cover tube 6 without heat of the hand being transmitted to any substantial extent to the Invar rod 22, and causing a change in the length thereof.

At its other end, namely, the end near ball 12, the cover tube 6 is fixed radially with respect to the Invar rod 22, by means of three angularly spaced screw elements 27a–c, in an annular collar 20, one of said screw elements again being under spring action as at 17c. The rounded ends of elements 27 engage and slide freely along the Invar rod 22, should the length of the cover tube 6 be changed by thermal action.

Significantly, the respective measurement balls 11 and 12 at ends of the ball rod 2 project beyond ends of cover tube 6 and are exposed for measurement-probe (23) access both at the repositionable end (12) and at the pivot/swivel end (11), it being noted that substantial clearance is provided for probe-23 contact with ball 11, within the span between the spaced articulated-fork bearing engagements on axis S. The center M of ball 11 is thus ascertainable by known coordinate-measurement machine techniques, for any orientation of the ball rod 2, and it is therefore not critical that the center M be strictly at the intersection of axes S and D.

A prop 9 consisting of two parallel bars 9a and 9b (shown in FIG. 2 on opposite sides of the cover tube 6) is pivotally connected at 8 to cover tube 6 via a clamp 7, the bars being connected to each other by two U-shaped parts, 29 at one end and 39 at the other end. At the outer end of cover tube 6, part 29 is mounted to clamp 7 for pivotal rotation (selective swing-out from its FIG. 2 position), about the axis ST; and at the other end of bars 9a and 9b, a continuous cylindrical prop rod 19 passes through U-shaped part 39; in FIG. 2, the two projecting ends of prop rod 19 are designated 19a and 19b. As can be noted from FIG. 1, these ends 19a, 19b are engageable in the corresponding locating grooves of each of the prop elements on plate 1 when prop 9 is swung out. In this way, the axis of ball rod 2 can be oriented at predetermined angles (illustratively 45°) with respect to the plane of the support plate 1.

A rectangular plate 30 carried by cover tube 6 in the vicinity of ball 12 serves for locating bar rod 2 in horizontal orientations. For such purposes, plate 30 is selectively engageable in the recess in a selected one of the rod-end locating elements 3a–c, where it can be securely clamped by a knob-operated clamp-screw part of the applicable locating element.

Figure 3:
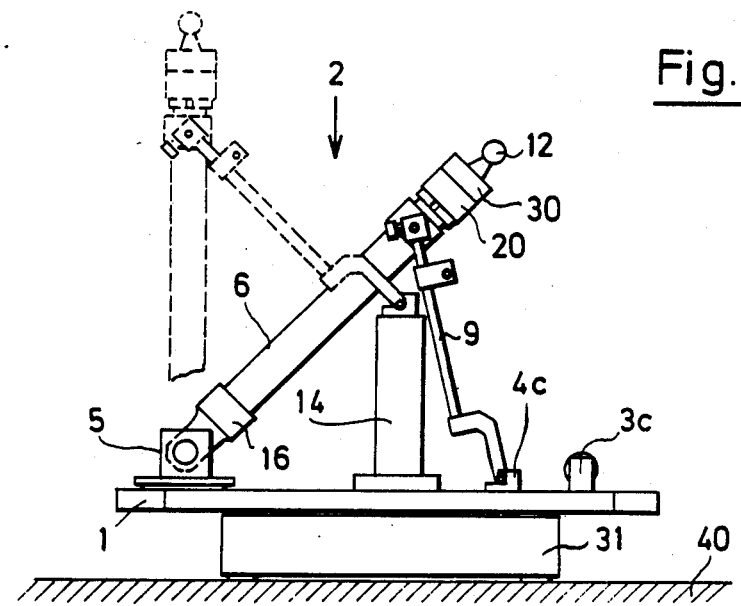
FIG. 3 is a simplified side view in elevation of the testing device of FIG. 1, wherein the ball rod of FIG. 2 is in a different position than depicted in FIG. 1.
Figure 4:
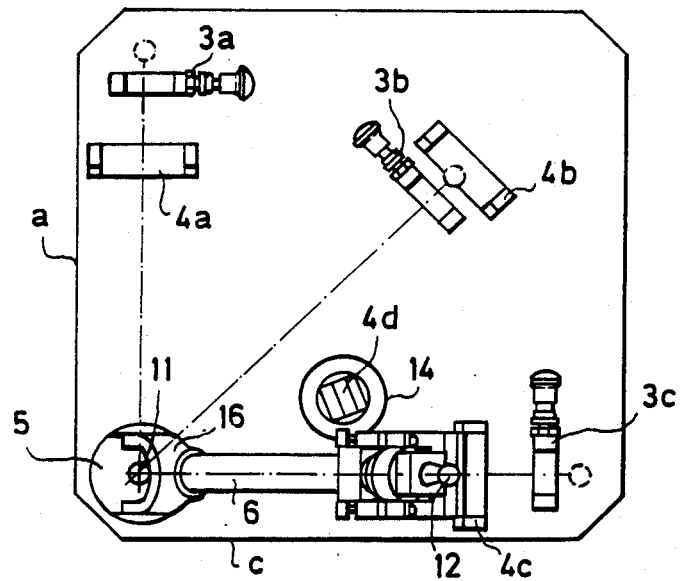
FIG. 4 is a plan view of the testing device as shown in FIG. 3.

From FIGS. 3 and 4 it can be seen that the described structure makes it possible to bring the ball rod 2 into a plurality of different positions, as prescribed for determining the uncertainty of measurement of a coordinate-measuring instrument in accordance with Standard B 89. Thus, the ball rod 2 can be oriented horizontally along a selected one of the orthogonal marginal limits of plate 1, the free end being clamped in the applicable one of the locating elements 3a and 3c; and a horizontal, diagonal orientation is effected by clamping in the locating element 3b. Further, upon swinging out prop 9 and engaging the same into one of the two prop-locating elements 4a or 4c, ball rod 2 can be oriented in a selected one of two vertical planes, perpendicular to each other and to plate 1, and inclined at an angle of 45° to the surface of the support plate 1; and a diagonal orientation at a different angle, of say 35° to the support plate, can be obtained if prop 9 is swung out and locked in the prop-locating element 4b, it being noted that prop element 4b is shown at greater radial offset from the swivel (vertical) axis D than is the case for prop-locating elements 4a and 4c.

Finally, a vertical orientation of ball rod 2 is also possible if, as shown by dashed outline in FIG. 3, prop 9 is inserted into the prop-locating element 4d of pedestal 14, which is mounted to table 1 at a location which will not interfere with ball-rod orientations determined by rod-end or prop-end location at 3b, 4b or at 3c, 4c.

FIG. 3 shows that the support plate 1 can be mounted by a turntable or bearing 31 supported on the measurement table 40 of the measuring instrument. In such case, turntable 31 provides a vertical axis of swivel action whereby ball rod 2 can be selectively oriented in a plurality of further positions within the measurement range of the coordinate-measuring instrument. For example, support plate 1 can be indexed about the turntable axis, in angular amounts of 90° with respect to the measurement table 40 of the coordinate-measuring instrument. If the turntable bearing 31 has its own drive and if this drive is connected with the control computer of the coordinate-measuring instrument, then a partially automated course of the measurement can also be obtained; thus, illustratively, after a given orientation of the ball rod 2 on plate 1, measurements on ball 12 (and, if desired, on ball 11) may be carried out under CNC control in different angular positions of the turntable 31, and this program can be repeated, for each resetting of the ball rod into a selected one of the different rod-end or prop-end locating elements on plate 1.

With the described testing device, the course of measurement can even be completely automated by a few additional measures. For example, a robotic device can be provided either on the support plate 1 itself or alongside the support plate. And, based on suitable programming, the robotic device can automatically orient the ball rod for successive locating reliance upon the different rod-end and prop-end locating elements. In such an arrangement, suitable motor-operated clamping or locking elements are provided for locking the ball rod or its prop in the desired different orientations. To this end suitable robotic devices are today commercially obtainable.

Another possible embodiment for the automatically shifted orientation of the ball rod consists of a pulling device and corresponding cam paths via which the movable end of the ball rod is guided in succession into the different measurement positions. In this case also, motor-driven clamping or locking elements should be provided for the dependable locking of the ball rod in each of the desired measurement orientations.

Standard B 89 requires that prescribed ball-rod measurements shall also be performed in the upper part of the measurement range of a coordinate-measuring instrument. For this purpose, the testing device of the invention can be used in the modified form shown in FIGS. 5 and 6, wherein the pivot/swivel joint 5/16 is upwardly offset above the support plate 1; as shown, a stand or pedestal 35 provides upward offset, and the pivot/swivel joint 5/16 is mounted to a holder 36 on stand 35, said holder having a base 42 which is mounted to stand 35 for swivel rotation about the vertical axis D.

Figure 5:
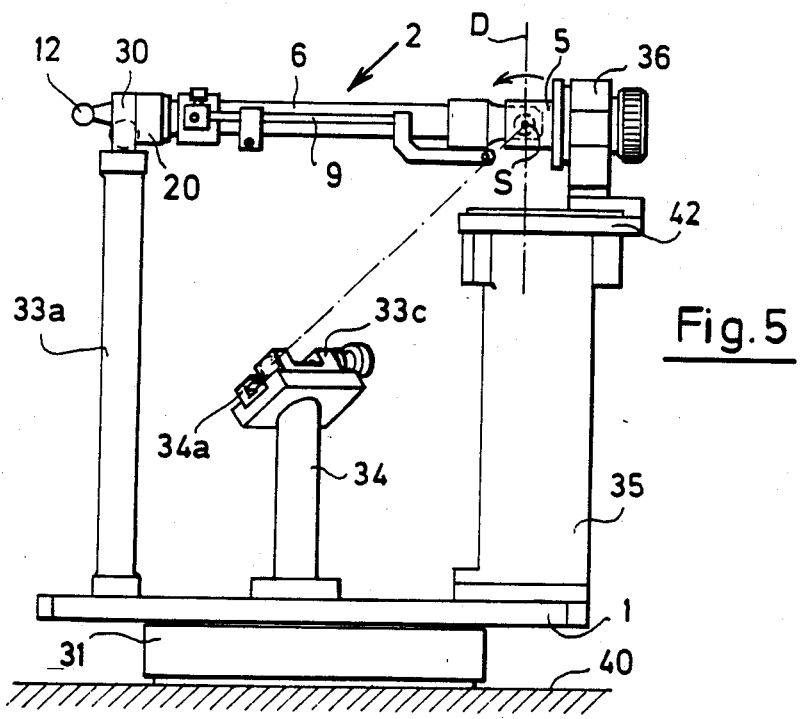
FIG. 5 is a side view of the testing device of FIG. 1, in a modified application.
Figure 6:
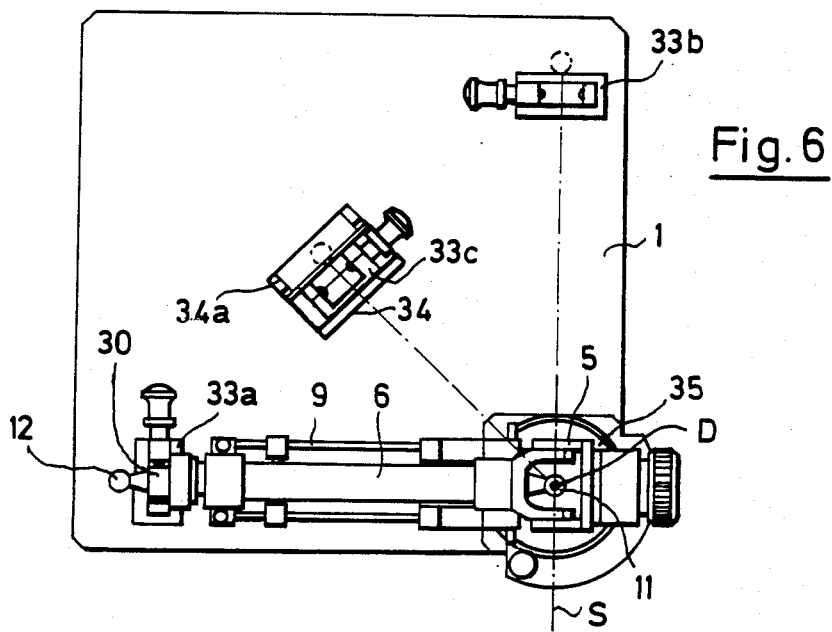
FIG. 6 is a plan view of the testing device as shown in FIG. 5.

In the modification of FIGS. 5 and 6, locating elements 3a and 3c of FIGS. 3 and 4 are also upwardly offset, being respectively mounted on stands 33a and 33b. In this way, the ball rod 2 can be oriented horizontally in the upper part of the measurement range of the coordinate-measuring instrument along the four sides of a parallelopiped. And a diagonal orientation in the upwardly offset plane parallel to the table top 1 is obtained by swinging out prop 9 and engaging the same into the prop-locating element 34a which is fastened, together with a rod-locating element 33c, on a column 34. The position shown by phantom alignment and directed diagonally downward into the center of the measurement space is obtained by inserting the front part 30 of the ball rod 2 into the holding element 33c on column 34.

With the variants of the measuring device described in FIGS. 3/4 and 5/6, the ball rod 2 can be brought into all positions required by Standard B 89, within the measurement space of a coordinate-measuring instrument. If a conversion of the variant shown in FIG. 3/4 into the variant shown in FIGS. 5/6 is not desired, it may be advisable to develop both variants as independent testing devices which can be interchanged for each other. For the case of two such separate testing devices, only the ball rod need be replaceable, so that both kinds of measurement can be performed with respect to the same ball-rod standard.

It should be emphasized that the described testing device permits free access for probe contacting of both balls of the ball rod, so that exact measurement results can be obtained even when the center point of the ball 11 of the ball rod does not lie precisely on the axes of the pivot/swivel joint 5/16.

What is claimed is:

1. A testing device for determining the uncertainty of measurement of a coordinate-measuring instrument having a work-contacting measurement probe, comprising a support (1) adapted for placement on the measurement table (40) of the coordinate-measuring instrument (13), said support containing a plurality of clamping elements (3a–c, 33a–c) which are adapted to receive a test standard in different orientations within the measurement range of the coordinate-measuring machine, characterized by the fact that the test standard is a ball rod consisting of two balls (11, 12) fastened to the ends of an elongate body (22), and that one end of the ball rod is mounted on the support (1) in a pivot/swivel bearing (5/16) which permits measuring-probe access to contact the ball (11) at said end.

2. The testing device according to claim 1, wherein said pivot/swivel bearing (5/16) is removably mounted on said support (1).

3. The testing device according to claim 1, wherein the body of said ball rod (2) is surrounded by a support tube (6).

4. The testing device according to claim 1, wherein a prop (9) is pivotally connected to the ball rod (2), and wherein a plurality of prop-end locating elements (4a–d) are provided at different locations on said support whereby for prop-end engagement to successive different locating elements said ball rod can be variously oriented.

5. The testing device according to claim 3, wherein a prop (9) is pivotally connected to the support tube (6), and wherein a plurality of prop-end locating elements (4a–d) are provided at different locations on said support whereby for prop-end engagement to successive different locating elements said ball rod can be variously oriented.

6. The testing device according to claim 1, wherein the axes of rotation (S, D) of the pivot/swivel joint (5/16) pass substantially through the center point of one (11) of the two balls of the ball rod.

7. The testing device according to claim 1, wherein the balls (11, 12) consist of a non-magnetic material.

8. The testing device according to claim 3, wherein at only one axial location the support tube (6) has axially retained engagement to the ball-rod body (22) and wherein at a second axial location the support tube has axially slidable engagement with the ball-rod body (22), thereby providing a degree of freedom for longitudinal expansion of the ball rod (2) with respect to the support tube (6).

9. A method for performing ball-rod measurements for testing uncertainty of measurement of a coordinate-measuring instrument with the use of a testing device according to claim 1, said method comprising the steps of:

(a) placing the testing device on a rotatable table within the measurement region of the coordinate-measuring instrument, (b) positioning the ball rod in a selected first orientation on the support, and for the first of a plurality of angular positions;

(c) using the measuring instrument to determine the coordinates of both balls;

(d) rotating the rotatable table to a different one of said plurality of angular positions, and repeating step (c) for each of said different angular positions;

(e) repositioning the ball rod in a selected second orientation on the support; and (f) repeating steps (c) and (d) for the selected second ball-rod orientation on the support.

10. A method according to claim 9, characterized by the fact that the orientation of the ball rod on the support is effected by robotic manipulation.

11. A method according to claim 9, characterized by the fact that the orientation of the ball rod is effected by motor-driven displacement of the ball rod along curved paths into the measurement positions.

12. In a testing device for performing ball-rod measurements on a coordinate-measuring instrument having a measurement table and a probe holder for a work-contacting probe, a test body (2) in the form of a ball rod having two balls (11, 12) each of which is fixed to one of the respective ends of an elongate body (22), a support (1) adapted for placement on the measurement table of the coordinate-measuring instrument, a plurality of clamping elements (3a–c, 33a–c) on said support (1) to receive said test body in different selected orientations in space, and a pivot/swivel joint (5/16) on said support (1), said joint being configured for inserted reception of one end of said test body.

13. The testing device according to claim 12, wherein said ball rod (2) additionally comprises a support tube (6) surrounding said elongate body (22).

14. The testing device according to claim 12, further comprising a prop (9) pivotally mounted at one end to the other end of said ball rod, and a plurality of prop-end locating devices on said support, each of said locating devices being adapted for selective locating engagement with the other end of said prop.

15. The testing device accordihg to claim 12, wherein the pivot/swivel joint is a universal joint having two axes of rotation which pass substantially through the midpoint of the ball (11) at the inserted end of the test body.

16. The testing device according to claim 15, in which the universal joint is configured for such clearance with the ball (11) at the inserted end of the test body as to provide free access for probe-to-ball measuring contact at the inserted end of the test body.

17. The testing device according to claim 12, in which the support (1) is adapted for attachment to the rotating table of a coordinate-measuring instrument.

18. The method for performing ball-rod measurements to test the uncertainty of measurement of a coordinate-measuring instrument using a testing device according to claim 17, which method comprising the following steps:

(a) placing the testing device on the rotatable table within the measurement range of a coordinate-measuring instrument for which the uncertainty of measurement is to be determined, (b) orienting the ball rod in a first position on the support of the testing device, (c) turning the support via the rotatable table into a succession of different angular positions, and using the coordinate-measurement instrument to determine the coordinates of both balls of the testing device for each of said angular positions, (d) orienting the ball in another position on the support, and repeating the measurements of step (c) for the reoriented condition of the ball rod; and (e) calculating the uncertainty of measurement of the coordinate-measuring instrument from measured values for the balls in the different ball-rod orientations and table-angle positions within the measurement range of the coordinate-measuring instrument.

19. The testing device of claim 8, wherein at said one axial location, the ball-rod body (22) has a circumferential locating groove (24), and wherein plural angularly spaced radial screws are operative to radially space and axially locate the support tube (6) with respect to the ball-rod body (22) at the groove location.

* * * * *